(12) United States Patent
O'Donnell et al.

(10) Patent No.: US 6,201,543 B1
(45) Date of Patent: *Mar. 13, 2001

(54) FRAMEWORK FOR SEGMENTATION OF CYLINDRICAL STRUCTURES USING TWO DIMENSIONAL HYBRID MODELS

(75) Inventors: Thomas O'Donnell, Englewood; Marie Pierre Jolly, Hillsborough; Alok Gupta, East Brunswick, all of NJ (US)

(73) Assignee: Siemens Corporate Research, Inc., Princeton, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/992,869

(22) Filed: Dec. 17, 1997

(51) Int. Cl.[7] ................................. G06T 15/00
(52) U.S. Cl. .............................. 345/420; 345/423
(58) Field of Search .................. 345/420, 423, 345/442, 425, 418, 419, 424

(56) References Cited

U.S. PATENT DOCUMENTS

| 5,416,894 | 5/1995 | Tanaka et al. | 345/433 |
| 5,435,310 | 7/1995 | Sheehan et al. | 128/653.1 |
| 5,570,430 | 10/1996 | Sheehan et al. | 382/128 |
| 5,782,762 | 7/1998 | Vining | 600/407 |
| 5,795,296 | 8/1998 | Pathak et al. | 600/443 |
| 5,920,319 | 7/1999 | Vining et al. | 345/420 |
| 5,923,770 | 7/1999 | O'Donnell et al. | 382/131 |

*Primary Examiner*—Cliff N. Vo
(74) *Attorney, Agent, or Firm*—Donald B. Paschburg

(57) ABSTRACT

A method of modeling a structure comprises the steps of initializing a parametric component of a hybrid model from a volumetric image, the volumetric image comprising image planes, creating starting points for two dimensional segmentations at intersections between the parametric component and the image planes, segmenting a boundary of the structure by applying active contours, sampling the active contours to create a dataset and parametrically and locally fitting the hybrid model to the dataset to represent the structure.

25 Claims, 13 Drawing Sheets

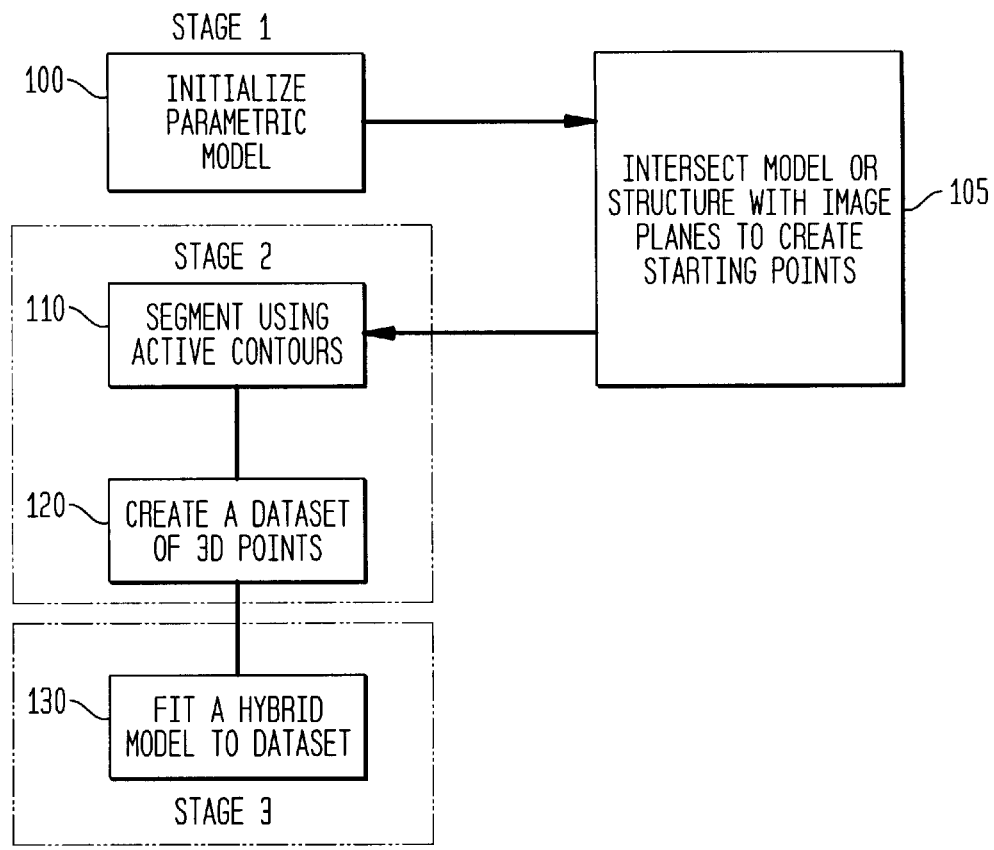
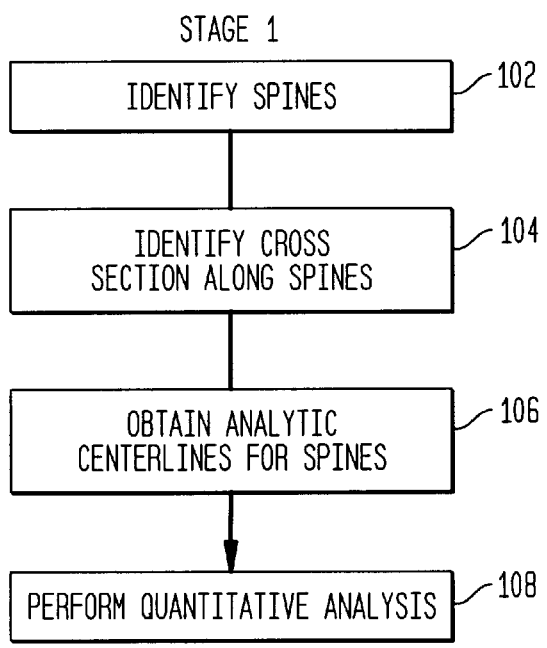

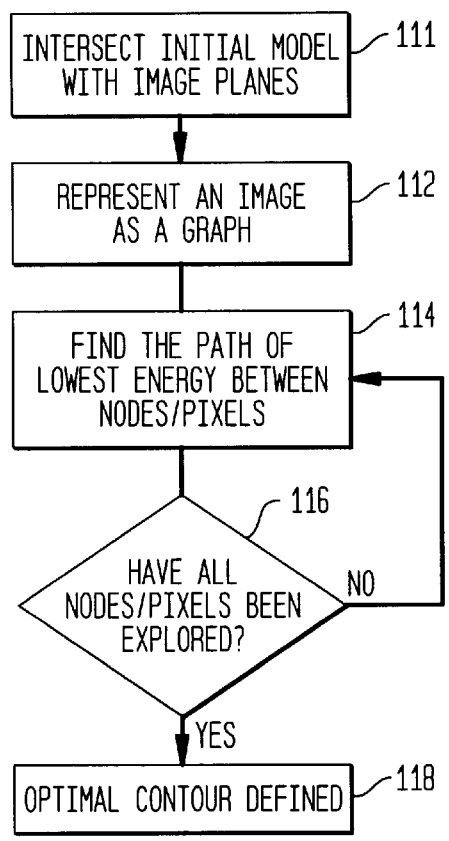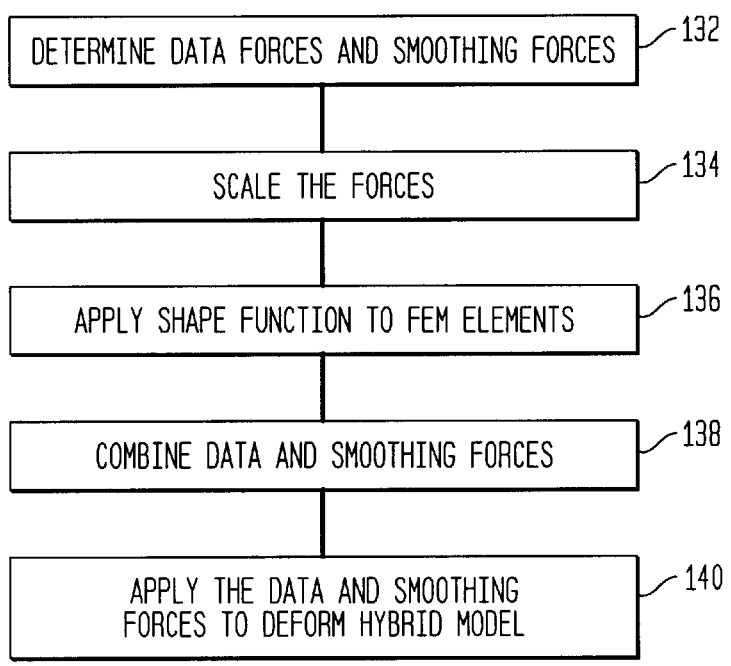

ALL THE POINTS ON THE
UNCERTAINLY LIST ARE
SOURCES AND SINKS

ONLY ONE POINT IS A
SOURCE AND A SINK

FRAMEWORK FOR SEGMENTATION OF CYLINDRICAL STRUCTURES USING TWO DIMENSIONAL HYBRID MODELS

BACKGROUND OF THE INVENTION

1. Field of the Invention

The present invention relates to computer modeling and more particularly to an implementation of a three dimensional hybrid model to aid in initiating and fitting the hybrid model to two dimensional segmentations to form an improved three dimensional model fit.

2. Description of Related Art

Branching cylindrical structures appear in as diverse embodiments as plant roots, industrial pipelines and coral reefs. However, by far the most studied instances are those in the human body. Vascular or bronchial complexes may be imaged by volumetric techniques such as CT and magnetic resonance (MR). Recovery of these structures facilitates surgical path planning, quantification of prosthetic stent dimensions, and the detection of aneurysms, stenoses and tumors.

A proposed method segments objects from 3D images using a 3D deformable surface which was made up of a series of 2D planar curves. However, the model proposed was not cohesive in terms of being "global" or "parametric". In addition, the 2D planar curves were not recovered via optimal active contours ("optimal" meaning that the energy function describing the contour had been globally minimized). Instead the proposed method employed snakes and relied on balloon forces to explore crevices. The problem with balloon forces is that the snake might leak where the image boundaries are not well defined. 2D deformable surfaces have also been applied to segmentation but the approaches have not been "optimal". For 1D contours, optimality is a well understood concept. How this concept might be extended to 2D surfaces still presents difficulty.

Direct application of 3D hybrid models to 3D image volumes has also met with mixed success since the model's overall topology is constrained by the underlying parametric component. Again, describing deep crevices becomes a problem. Some proposed methods fit parallel sets of 2D contours to recover a 3D object. Once the fit is settled they repeat the process from an orthogonal direction using the results of the previous iteration as a starting point. However, they employ balloon forces to fit the 2D contours and their result is not a coherent parametric model. In addition, they demonstrate their method on relatively simple synthetic shapes. Region growing techniques may be used for segmentation. However, while they are often effective they suffer from bleeding in areas where the object boundary is not well defined. In addition, they do not result in a geometric description of the object, rather a collection of voxels.

Segmentation via the propagation of 2D active contours (i.e., using the result from a previous slice as the starting point for a segmentation of the current slice) may be problematic. A change in object's circumference in a slice might be due to a change in the radius of the object under recovery, or it might be a change in direction of the path taken by the object in space. Determining if a change in circumference or direction has occurred is essential for selecting an appropriate starting point for segmentation in the slices to follow. A change in circumference may indicate the initiation of a change in the topology of the object such as a bifurcation. For example, an aortic arch includes all three which occur simultaneously. Two dimensional active contours lack the global properties to account for these instances.

Active contours were first proposed under the name of snakes. Snakes are defined as contours that are pushed or pulled towards image features by constraining forces. A typical energy function for a snake is expressed as:

$$E = \int \{\alpha |u_s(s)|^2 + \beta |u_{ss}(s)|^2 - \lambda |\nabla I|^2\} ds$$

where the first two terms measure the smoothness of the contour (in terms of the first and second derivatives of the contour) and the third term measures the amount of edge strength in the image along the contour. It is desirable to minimize this energy function to find a contour which is both smooth and which coincides with high gradient magnitude points in the image. This energy is often minimized using Euler equations and gradient descent. The disadvantage of this technique and many of the subsequently proposed algorithms is that, since the minimization is based on gradient descent, it is not guaranteed to locate the global minimum of the energy function. As a result, neighboring edges can be very distracting to the process and depending on the initial configuration, different local minima of the energy function might be reached.

Graph search algorithms have been used in the past to look for the global minimum of the active contour's energy function. An image is represented as a graph by defining a node for each pixel and creating an arc between two nodes if the two corresponding pixels are connected. The energy function of the discrete contour is defined as:

$$E = \sum_{k=1}^{n} \frac{1}{|\nabla I|^2(P_k) + \varepsilon} + \mu \sum_{k=1}^{n-1} |\vec{\nabla} I(P_k) - \vec{\nabla} I(P_{k+1})|$$

where the $P_k$'s are the points on the contour, $$|\nabla I|$$

is the gradient magnitude and $$\vec{\nabla} I$$

denotes the gradient direction. The energy function combines gradient magnitude and curvature information. The coefficient $\mu$ balances the importance between the two components.

An important result of graph theory states that a dynamic programming approach for finding shortest paths in a graph can be replaced by Dijkstra's algorithm under the condition that all the edge costs are positive. To apply Dijkstra's algorithm to images, an image should be viewed as a graph where the nodes correspond to pixels and an edge is defined as a bridge between two neighboring pixels. At initialization, the cost for all nodes is set to be infinite and all the nodes are marked as unvisited. In addition, the cost at a finite set of source points is set to 0. A heap containing all the finite cost nodes which is ordered in terms of increasing cost is constructed and is maintained throughout the procedure. At each iteration, the node (i,j) with the best cost is retrieved from the heap. The cost at the neighboring pixels (k,l) is then updated by determining if there is now a shorter path from the source to (k,l) going through (i,j):

$$E(k,l) = \min \{E(k,l), E(i,j) + e(i,j,k,l)\}$$

where $$e(i, j, k, l) = \frac{1}{|\vec{\nabla} I|^2(k, l) + \varepsilon} + \mu |\vec{\nabla} I(i, j) - \vec{\nabla} I(k, l)|$$

These steps are repeated until the heap is empty and all the nodes have been explored. In addition, at every node, the algorithm keeps track of the previous node on the shortest path. This way, the algorithm can simply backtrack down the list from the sink points to recover the optimal contour.

A physically-motivated recovery can be analogized to physical systems, independent coefficients for scaling data forces and material forces (e.g., smoothing) are used. Scaling data forces without regard to the material forces may cause instability in fitting, however. Tractable convergence requires an appropriate scaling of the forces, or alternatively an appropriate selection of time step or euler coefficient. Many methods do not address how to choose these values. An intuitive, practical implementation of quantities such as force coefficients which guarantee quick recovery with stability have been lacking in other proposed methods. This approach would advantageously lead to the assignment of unit values to time step and euler coefficients, thus increasing the generality of the physically-motivated scheme.

Hybrid models are powerful tools. They simultaneously provide a gross parametric as well as a detailed description of an object. It is difficult, however, to directly employ hybrid models in the segmentation process since they are not guaranteed to locate the optimal boundaries in cross-sectional slices. Propagating 2D active contours from slice to slice, on the other hand, to delineate an object's boundaries, is often effective, but may run into problems when the objects topology changes, such as at bifurcations or even in areas of high curvature.

A cooperative framework to exploit the positive aspects of both 3D hybrid model and 2D active contour approaches for segmentation and recovery may be advantageous. In this framework, the user-defined parametric component of a 3D hybrid model would provide constraints for a set of 2D segmentations performed by active contours. The same hybrid model may then fit both parametrically and locally to this segmentation. For the hybrid model fit, several new variations on the physically-motivated paradigm which seek to speed recovery while guaranteeing stability may be employed. A by-product of these variations may be an increased generality of the method via the elimination of some of its ad hoc parameters. A cooperative framework may be applied to the recovery of branching cylindrical structures from 3D image volumes. An advantage of this framework may permit a parametric component for fusion of individual cylinders.

Therefore, a need exists for a general cooperative approach for segmenting objects from 3D image volumes which exploits the positive aspects of both 2D and 3D traditional approaches. Advantageously, the cooperative approach may include new variations on the physically-motivated paradigm for fitting hybrid models which seek to accelerate the process while ensuring stability and decreasing reliance on the ad hoc parameters. A need also exists for the recovery of branching cylindrical structures using a unique and flexible model formulation.

SUMMARY OF THE INVENTION

A method of modeling a structure comprises the steps of initializing a parametric component of a hybrid model from a volumetric image, the volumetric image comprising image planes, creating starting points for two dimensional segmentations at intersections between the parametric component and the image planes, segmenting a boundary of the structure by applying active contours, sampling the active contours to create a dataset and parametrically and locally fitting the hybrid model to the dataset to represent the structure.

Other methods may further include the step of providing starting points for segmentation using intersections of image slices. The step of parametrically and locally fitting the hybrid model may include the step of applying forces to draw the hybrid model onto the data of the dataset. The step of reducing a number of iterations-to fit the hybrid model by introducing a finite element shape function for distributing forces to draw the hybrid model to data of the dataset may be included. The shape function may be represented by the formula:

$N_1(s)=1+(2s-1)(1-s)$ $N_2(s)1-(2s-1)s.$ where $N_1(s)$ is the shape function evaluated at a first node at point s and $N_2(s)$ is the shape function evaluated at a second node at point s.

The shape function may also be represented by the formula:

$N_1(s)=(1-s/\max(s,(1-s))$ $N_2(s)=s/\max(s,(1-s)).$ where $N_1(s)$ is the shape function evaluated at a first node at point s and $N_2(S)$ is the shape function evaluated at a second node at point s.

The step of introducing a scale factor to weight data locations from the dataset to provide a scaled force vector that more rapidly fits the hybrid model to the data locations may also be included. The scaling factor may be represented by the formula:

$$K_{data} = \max_i \sum_{j=i}^{M} N_i(s(j)).$$

where i is a set of al nodes and M is a number of datapoints associated with a node i, j has a closest point on an element s(j) in element coordinates and $N_i$ is a shape function for node i with respect to element s(j).

The forces may include data forces and smoothing forces. The step of combining the data forces and the smoothing forces by introducing a trade-off parameter τ for balancing data forces against smoothing forces and thereby providing increased stability to the structure may be included.

A method of modeling branching cylindrical structures includes the steps of initializing a parametric component of a three dimensional hybrid model from a volumetric image of the branching structure, the volumetric image comprising image planes, creating starting points for two dimensional segmentations at intersections between the branching structure and the image planes, segmenting the branching structure by applying two dimensional active contours to the image planes to more accurately depict features of the branching structure, sampling the active contours to create a dataset and parametrically and locally fitting the hybrid model to the dataset to represent the branching structure by applying forces to draw the hybrid model onto the data of the dataset.

BRIEF DESCRIPTION OF DRAWINGS

The invention will be described in detail in the following description of preferred embodiments with reference to the following figures wherein:

FIG. 1 is a flow diagram showing method steps and three stages of the present invention;

FIG. 2 is a flow diagram showing in further detail the steps of Stage 1 of FIG. 1;

FIG. 3 is a flow diagram showing in further detail the steps of Stage 2 of FIG. 1;

FIG. 4 is a flow diagram showing in further detail the steps of Stage 3 of FIG. 1;

DETAILED DESCRIPTION OF PREFERRED EMBODIMENTS

Figure 5A:
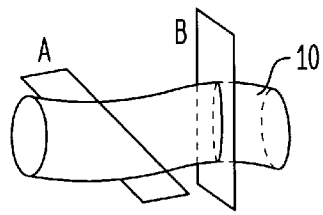
FIGS. 5A–C is a perspective view of a spine showing cross-sections A and B.

A cooperative framework includes a method for combining three dimensional (3D) hybrid models with two dimensional (2D) segmentations. In one example, a user initializes a parametric component of a hybrid model. A hybrid model is a parametric model with a spline-like mesh on its surface which is capable of deforming to describe fine detail in an image volume. Intersections of image slices with the parametric component serve as starting points for a segmentation of the object boundaries using active contours. The resulting segmentations are sampled to create a dataset of 3D points to which the original hybrid model is fit. The hybrid model is free to both parametrically and locally deform to represent the object of interest. In this way, the user initializes the hybrid model, the hybrid model initializes the 2D active contours, and the active contours constrain the fit of the hybrid model. This fit is referred to as a physically-motivated fit.

The physically-motivated fit of the hybrid model is accelerated in two ways. First, by introducing a new finite element formulation for distributing data forces, an attempt is made to apply the appropriate data forces to draw the model onto data rather than merely towards it. In this way, several iterations of a recovery process are saved. Also, when recovering a local component of the hybrid model, it is not necessary to continue the rigid body and parametric fits, thus saving computation time. Stability in fitting is increased by scaling the data forces such that a maximal force over all model elements will not draw that element past the weighted average of the data attracting it. The model's smoothing forces are similarly scaled. To ensure the stability of the fit, the data and smoothing forces are combined in an intuitive and novel way under the physically-motivated paradigm. Traditionally, smoothness has been enforced by increasing stretching or bending penalties in an associated energy formulation. However, imposing these penalties may lead to a backlash, i.e. small perturbations in the model shape due to data forces resulting in a severe compensatory force "shattering" the model. A method for combining data and smoothness forces which avoids this situation is introduced herein.

An important aspect of this approach is the elimination of several ad hoc parameters from the physically motivated fit process. By replacing euler coefficients, time steps, stretching penalty coefficients and data force coefficients with a single parameter which describes a trade off between data forces and smoothing forces, ad hoc parameters are reduced.

A method to recovery focuses on branching cylindrical structures. Branching cylindrical structures appear in diverse embodiments such as plant roots, industrial pipelines and coral reefs. However, by far the most studied instances are those in the human body. Vascular or bronchial complexes may be imaged by volumetric techniques such as CT and magnetic resonance (MR). Recovery of these structures facilitates surgical path planning, quantification of prosthetic stent dimensions and the detection of aneurysms, stenoses and tumors.

Referring to FIG. 1, a flow chart of the method of the present invention. As described above, block 100 represents an initialization of a paramtric component of a hybrid model. This includes taking a volumetric image of an object to be modeled and creating cylinder models whose cross-sections are always orthogonal to the cylinders' spines to describe the object. The cross-section can be star shaped, for example. The intersection of the cylinder models with the imaging planes results in an approximation to the cross-section of the object in the image. This approximation is used as a starting point for active contour segmentations in the image, in block 105. In block 110, segmentation using active contours is performed on the object in the image. The segmented contours are used to create a dataset of 3D points in block 120. In block 130, the model is fit to the data points of block 120 to represent the object.

Referring to FIG. 2, block 100, initializing the parametric component, includes identifying approximate center points, that is positions along the centerline of the object in block 102. The approximate positions of the points on the surface of the object are identified in block 104. Analytic centerlines are obtained by linking centerpoints in block 106. The features of the object are quantified for representation by the hybrid model.

Referring to FIG. 3, in a preferred embodiment a two dimensional image is represented as a graph in block 112. In block 111, the initial model image and the image planes intersect. These intersections are used as start points for 2D segmentation. A path of lowest energy between pixels/nodes is determined as described above under the heading of Stage 2. This step is repeated by decision block 116 until all pixels/nodes have been explored. By determining the lowest energy path a contour (path) is defined in block 118.

Referring to FIG. 4, fitting the hybrid model of block 130 includes determining data and smoothing forces for the points of the dataset in block 132. The data and smoothing forces are scaled in block 134. Shape functions which reduce the number of iterations needed to fit the hybrid model to the data are applied to FEM elements in block 136. Data and smoothing forces are combined in block 138. Applying the adjusted forces to the hybrid model to deform the hybrid model is performed in block 140.

Figure 5B:
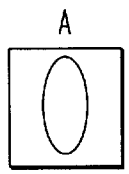
Figure 5C:
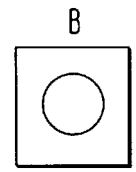

Model formulation includes individual cylinders which make up the parametric component of the model. The individual cylinders have spines which are arbitrary space curves and cross-sections which lie in a plane locally orthogonal to the spine. Referring initially to FIGS. 5A–C, two planes for measuring a vessel's cross-section are shown. In FIGS. 5A–C, a vessel 10 has a measurement of its diameter distorted. Image A results from a plane 12 which is not orthogonal to a spine. Image B results from cutting in a plane 14 orthogonal to the spine. The true diameter of the vessel may be inferred via Image B.

The cross-section functions of the parametric component may be any star shaped planar curve and are free to change along the spine. Using this parametric description, analytic centerlines of the individual cylinders may be obtained which provide, among other things, the appropriate viewing planes for quantitative analysis. These individual cylinders are linked to form a branching structure without explicit tessellation in order to endow the model with flexibility and descriptive power.

Segmentation is among the most widely researched topics in computer vision. A comparison of the cooperative framework described in this disclosure is compared with the most closely related work. However, the method as described is applicable to other techniques and systems.

A method of providing a representation of a branching tubular structure includes incorporating into a branching structure, individual cylinders which have the following characteristic: a spine which is a space curve, and a cross-section of the spine is a star-shaped function which is always in a plane orthogonal to the spine. (See FIGS. 5A and 5C).

Figure 6A:
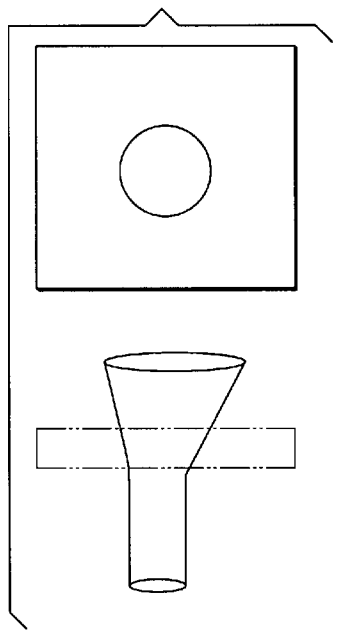
FIGS. 6A–C is a side perspective view of three types of branching cylinders and associated cross-sections.
Figure 6B:
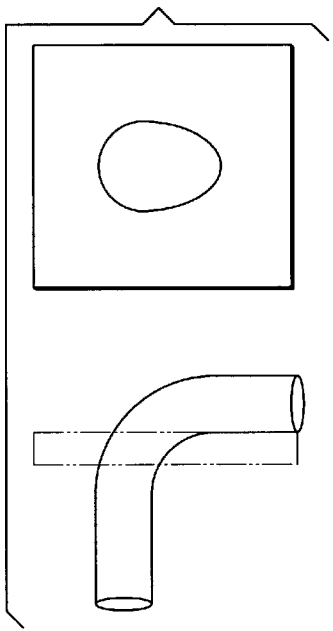
Figure 6C:
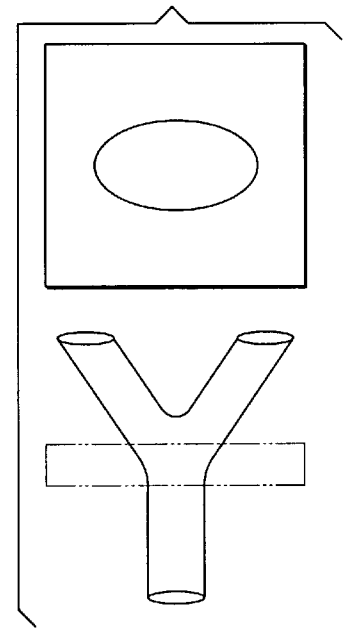

Referring to FIGS. 6A–C, other individual cylinder formulations may allow the spine to be a space curve, but restrict the cross-section to be circular (FIG. 6A). Or, the formulation may permit an arbitrary cross-section function but puts limits on the form of the spine. Alternately, the cylinder may not have an explicit spine at all, or it may have a spine but not guarantee that the cross-section is orthogonal to that spine (FIG. 6C). With regard to linking the individual cylinders into a tree-like structure, an implicit linkage is used.

Figure 7:
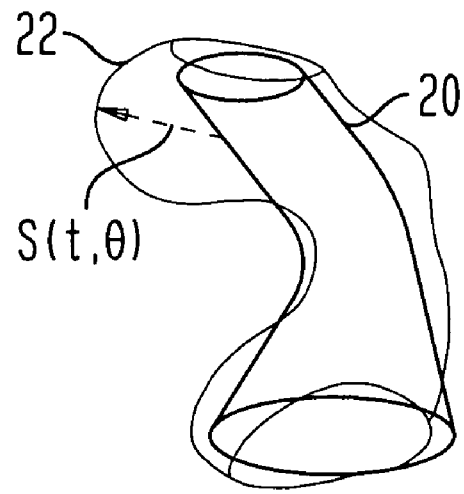
FIG. 7 is a perspective view of a portion of a hybrid model showing a prametric component and a local component.

Referring to FIG. 7, cylinder model formulation is hybrid in that it is made up of a parametric component 20 and a local, spline-like mesh component 22 (represented by $S_i(t, \theta)$) over the parametric component. This local component may deform away from the parametric surface to describe fine detail. The parametric component of the cylinder model is based on a spine which is expressed in terms of cubic B-splines. B-splines are piecewise polynomial functions connected at knot points. Tangent points of the spine are calculated at the knot points and minimal rotations needed to align each tangent with the one following it are calculated as well. These minimal rotations permit construction of discrete frames at each of the knot points. Interpolation is performed between each of the frames using an Extruded Generalized Cylinder (EGC) model. The EGC bases its coordinate system on the frames at either end of each span. The cross-section of the cylinder is plotted on the continuous frames provided by the EGC models.

Figure 8:
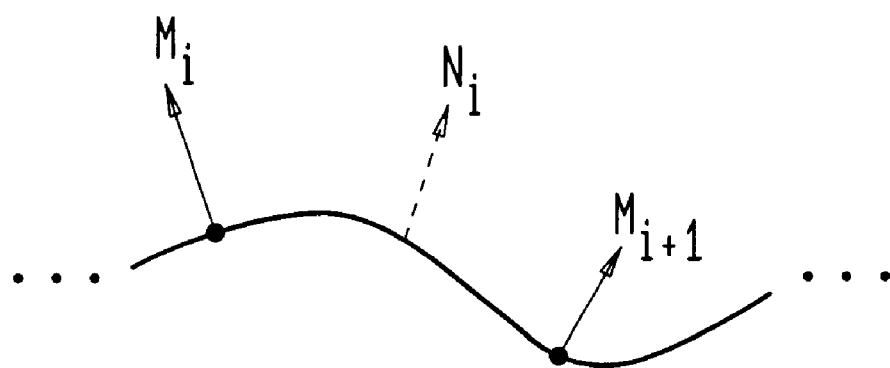
FIG. 8 is a vector drawing showing vector interpolation of $N_i$ along a model span.

Referring to FIG. 8, the spine of the parametric model is made up of (n−1) piecewise cubic polynomial functions, $C_i(t)$, $i=1, \ldots, (n-1)$, which are connected by n knot points, $(P_1 \ldots P_n)$. $C_i(t)$ may be calculated in terms of control points, $(V_1 \ldots V_n)$, and an intrinsic parameter t which runs [0,1) along each $C_i(t)$.

$$C_i(t) = [t^3\, t^2\, t\, 1] \cdot C \cdot V_i^T, \quad t \in [0,1), \; i=1, \ldots, n-1$$

where $$C = \frac{1}{6}\begin{vmatrix} -1 & 3 & -3 & 1 \\ 3 & -6 & 3 & 0 \\ -3 & 0 & 3 & 0 \\ 1 & 4 & 1 & 0 \end{vmatrix}$$

and $$V_i = [V_{i-1}\, V_i\, V_{i+1}\, V_{i+2}], \; i=1, \ldots, n-1.$$

Since the knot points appear at the beginning and end of every piecewise polynomial, $$C_i(0) = P_i, \; C_i(1) = P_{i+1}, \; i=1, \ldots, n-1$$

Thus the knot points may be represented as:

$$P_i = \tfrac{1}{6}(V_{i-1} + 4V_i + V_{i+1}).$$

Assuming an open ended spine, two more constraints may be included thereby increasing the number of control points by two, $$V_0 = 2V_1 - V_2,$$

$$V_{n+1} = 2V_n - V_{n-1},$$

and using the array shorthands, $$P = [P_1, \ldots, P_n]$$

$$V = [V_1, \ldots, V_n]$$

the knot points can be expressed in terms of control points, $$P = [D] \cdot V$$

where $$[D] = \frac{1}{6} \cdot \begin{vmatrix} 6 & & & & \\ 1 & 4 & 1 & & \\ & & \cdots & & \\ & & 1 & 4 & 1 \\ & & & & 6 \end{vmatrix}.$$

To compute a point anywhere along the spine a calculation of the proper $C_i$ on which it resides is performed. This linear system may be solved for the control points, plugging the results into $C_i(t)$ to calculate the spine.

At each of the knot points, $P_1 \ldots P_n$ a discrete trihedral frame is created by first computing the normalized tangents at each knot point, $A(P_i)$, $$A(P_i) = \frac{dC_i(t)}{dt}, i = 1 \ldots (n-1) \text{ at } t = 0$$

$$A(P_n) = \frac{dC_{n-1}(t)}{dt} \text{ at } t = 1$$

and determine the vector, $F_i$, orthogonal to each pair of tangents along the spine, $$F_i = A(P_i) \times A(P_{i+1})$$

and the angle, $\alpha_i$, around this vector which will align the tangents $$\alpha_i = \arccos(A(P_i) \cdot A(P_{i+1}))$$

Then quaternions $Q_i$, based on $F_i$ and $\alpha_i$, I=0, . . . , n are formulated. (Assuming for i=0 the transformation is from a unit Z vector to $A(P_1)$).

$$Q_i(\alpha_i, F_i) = \left(\cos\left(\frac{\alpha_i}{2}\right), \sin\left(\frac{\alpha_i}{2}\right)F_i\right)$$

The concatenation of rotations may be defined in matrix form, $Q_i$=Matrix Form $$\left(\prod_{j=0}^{i=1} Q_j\right)$$

$L_i$ is specified as the translation of a point from the origin to the knot point $P_i$. Then, a local coordinate frame at knot point $P_i$ may be calculated by the transformation, $$B_i = Q_i \cdot L_i.$$

Therefore, to calculate each of the successive frames, a series of rotations is applied to the unit {Z} vector (any starting vector is acceptable) followed by a translation to align this vector with the tangent at each of the knot points. The unit {X} vector may transformed with the same process to create a vector in the normal plane at each of the knots. These vectors called $M_i$ will serve as the basis for aligning the EGCs on each span, $$M_i = B_i \cdot X, i=1, \ldots n.$$

For each span, $C_i$, i=1, . . . , (n-1)

the vector $N_i(t)$ is calculated.

$$N_i(t) Q_i \cdot Q(\alpha t, F) \cdot C_i(t)$$

$N_i$ serves as reference direction for calculating the frame along the span. It is aligned with $M_i$ at the knot point corresponding to t=0 and is linearly interpolated along the span such that it is aligned with the $M_{i+1}$ at the knot point corresponding to t=1, as shown in FIG. 8.

$$N_i(0) = M_i$$

$$N_i(1) = M_{i+1}$$

A point, $K_i(t)$ in the plane orthogonal to the spine at $C_i(t)$ is calculated by finding the intersection of the line passing through $[C_i(t) + N_i(t)]$ in the direction of the tangent $T_i(t)$ with the orthogonal plane. Note that the $_i$ and (t) are dropped hereinafter for readability (i.e., $(T_x, T_y, T_z) = T_i(t)$).

$$K = \begin{pmatrix} C_x + N_x - T_x^2 N_x - \\ T_x T_y N_y - T_x T_z N_z, \\ C_y - T_x T_y N_x + N_y - \\ T_y^2 N_y - T_y T_z N_z, \\ C_z - T_x T_z N_x - \\ T_y T_z N_y + \\ T_x^2 N_z + T_y^2 N_z \end{pmatrix}$$

where $$T_i(t) = \frac{dC_i(t)}{dt}.$$

Figure 9:
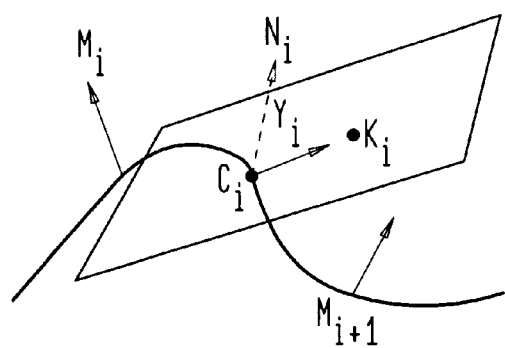
FIG. 9 is a vector drawing showing the span of FIG. 8 and showing components for calculating vector $U_i$.

A unit direction is designated, $U_i(t)$ (for up), as a normalized vector from $C_i(t)$ to $K_i(t)$, and $R_i(t)$ to be the cross product of $U_i(t)$ and $T_i(t)$, as shown in FIG. 9.

$$U_i(t) = \frac{(K_i(t) - C_i(t))}{|(K_i(t) - C_i(t))|}, R_i(t) = U_i(t) \times T_i(t)$$

This forms a continuous unit trihedral frame upon which a plot of the cross-section function is made. It should be noted that the line passing thru $C_i(t)$ and $(C_i(t) + N_i(t))$ must intersect the plane orthogonal to the spine at $C_i(t)$ for this approach to work (i.e., it fails at $$T_i(t) \cdot N_i(t) = 1).$$

This anomaly is a very unusual case and may be tested for. It can be alleviated simply by calculating an d including local frames at the offending points.

A coordinate system may be constructed given a space curve. It may be noted that, $$\Gamma: I \to \Re^3,$$

where I is an open connected subset of the unit circle $S^1$ (with increasing t corresponding to a counterclockwise orientation). It is possible to choose a smooth family of unit vectors $$\vec{V}(t)$$

normal to the tangent of $$\Gamma, \vec{T}(t) \text{ such that } \vec{V}(t) \cdot \vec{T}(t) = 0$$

for all t. This may be done by considering a smooth map $$T: I \rightarrow S^2$$

which takes t to $$T$$

From any vector V in $$S^2 - T(I) \text{ the field } \vec{V}(T)$$

may be obtained by orthogonally projecting V onto each of the normal planes to $\Gamma$ and normalizing. By Sard's Theorem there are many such vectors. Of the many choices, one is chosen which is easy to manipulate.

An elliptical cross-section may be chosen to implement although any type of star shaped cross-section is permitted. The radial parameters, $\rho 1_i$ and $\rho 2_i$, i=1, . . . , n are specified at the knot points and interpolated along the span. Thus a point on the span, $$J_i(t, \theta),$$

may be expressed as:

$$J_i(t,\theta) = C_i(t) + r2_i(t) \cos(\theta) U_i(t) + r1_i(t) \sin(\theta) R_i(t) \text{ for } i=1, \ldots, (n-1)$$

$$r1_i(t) = \rho 1_i(1-t) + \rho 1_{i+1} t$$

$$r2_i(t) = \rho 2_i(1-t) + \rho 2_{i+1} t$$

Local displacements, $$S_i(t, \theta),$$

away from the parametric model surface are interpolated via FEM shape functions based on the model's triangular element tessellation. In order to ensure a smoothness of fit, this mesh-like component is endowed with a stretching penalty which penalizes sharp edges.

Figure 10:
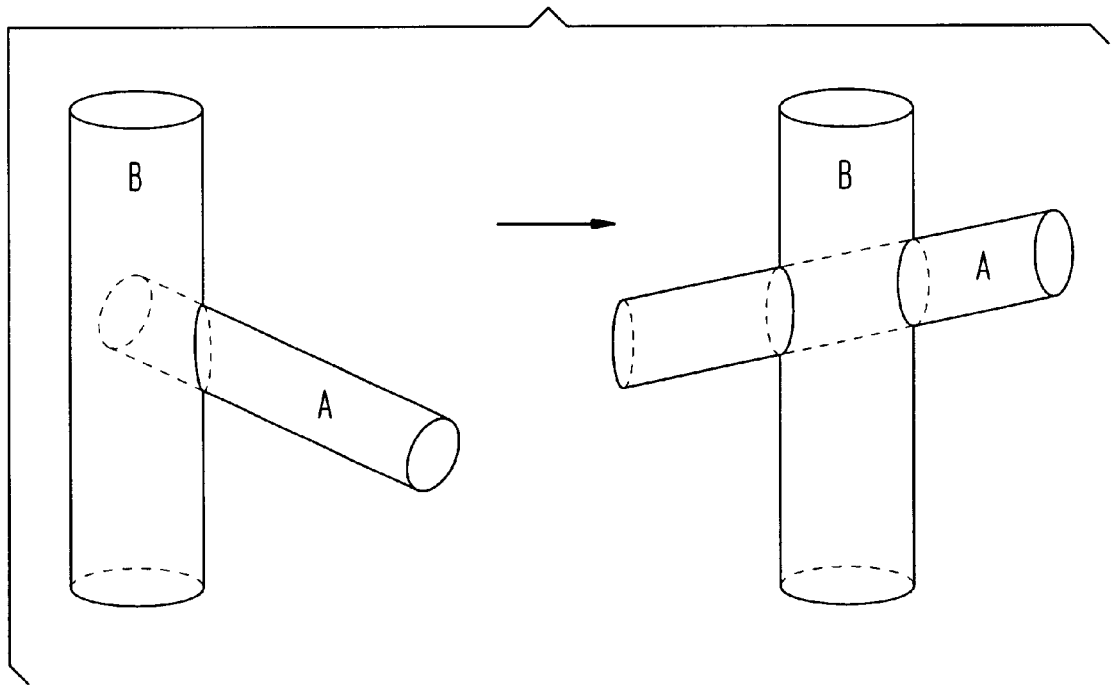
FIG. 10 is a side perpective view showing independent cylinders having the ability to adjust during model fitting.

Referring to FIG. 10, the branching structure is composed of individual cylinders, A and B for example, with no explicit linkage or shared tessellation among them. That is, the cylinders are not "connected". They are separate models which fit to the data independently and may freely pass through one another during recovery. Portions of a cylinder which lie inside the boundary of another cylinder are not realized (dashed lines in FIG. 10) (i.e., are not rendered and do not take part in recovery). Using this simple and flexible approach, the tree structure is free to deform from its original configuration. This is particularly useful when fitting from a poor initial guess.

Figure 11:
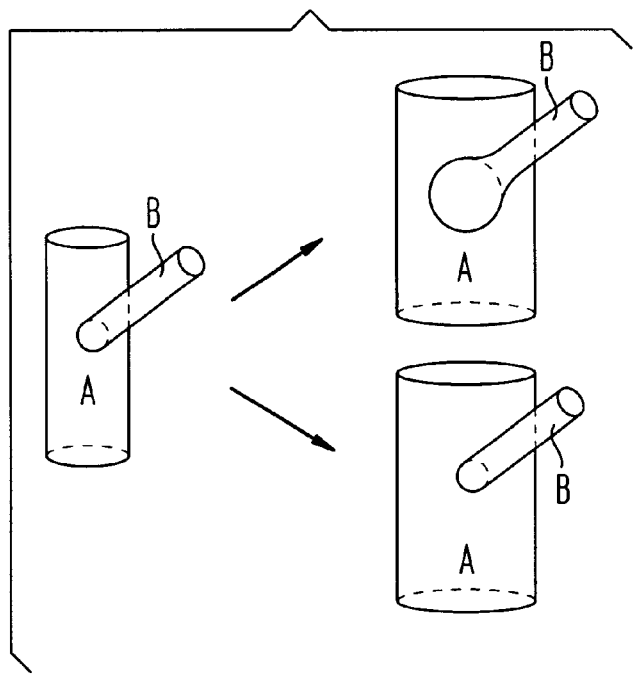
FIG. 11 is a side perspective view of a branched tree configuration showing explicit tesselation fixes to an initial tree configuration.

Referring to FIG. 11, by comparison, employing an explicit tessellation fixes the initial branching topology. And, the relative proportions of cylinders, A and B with respect to one another may be compromised during fitting.

If a link between the branches via some tessellation had been chosen, calculating the tessellation boundary would have become extremely difficult. Closed form, analytic solutions for the intersections of model-particularly after local are quite complex. And, connecting branches based on variations of standard triangular tessellations generally yield unsatisfactory results. Iterative methods exist for linking tessellations, but they are complicated and may not be optimal.

The cooperative framework for segmentation and recovery takes place over three stages: user initialization, segmentation, and hybrid model fit.

Stage 1: User Initialization

In this stage, the user provides an approximation to the object of interest by instantiating the parametric component of a hybrid model. The method for doing this depends on the topology of the object and the form of the parametric component. Here, a method for approximating a tree-like object with a branching parametric cylinder is described. Note that the approximation may be quite rough as the segmentation routine (Stage 2) will discover the exact object boundaries.

For each branch of the object of interest, the user specifies an approximation to a centerpoint of the branch (the centerpoint) in at least two image slices. The number of approximate centerpoints required is a function of the topology of the branch. If the trajectory is relatively straight then two specifications are sufficient. If however, the route taken by the branch is more complex, more specifications may be necessary. A single centerpoint per significant bend is generally sufficient but more may be used as required. The centerpoints associated with each branch are connected by the system to form the parametric component's spine. The user must also specify an approximation to each branch's radius by indicating at least one point on the branches surface (a surfacepoint). A surfacepoint need not be on the same image slice as the centerpoint. The branch's radius is computed by finding the distance from the surface points to the closest point on the model's spine. A weighted average of these branch radii approximations are assigned to the cylinder models' radius parameters along the spine. The result is a set of parametric cylinder models with a possibly varying radii, which form an estimate of the 3D tree structure.

Stage 2: 2D Optimal Active Contour Segmentation

In Stage 2, the system exploits the 3D parametric model component from Stage 1 to initiate the segmentation of the object's surface in each of the 2D image slices in the original image volume. The intersection of the 3D model with a single image plane results in a set of curves which estimate the object's cross-section. The type of curve (open or closed) depends on the angle of intersection with the model. And, the number of curves is a function of the degree of branching. Starting from these estimates, a 2D active contour following algorithm minimizes an energy function combining image gradient information, contour smoothness, and gray level statistics inside the contour. The result is a series of optimal segmentations of the structure.

Figure 12A:
FIG. 12A is a photographic image of a cross-section of a lumen having points overlayed thereon.

Referring to FIG. 12A, for each image, a search space is defined in which the contour will be located. The estimate of the contour is subsampled to create a series of points 28 as shown in FIG. 12A.

Figure 13:
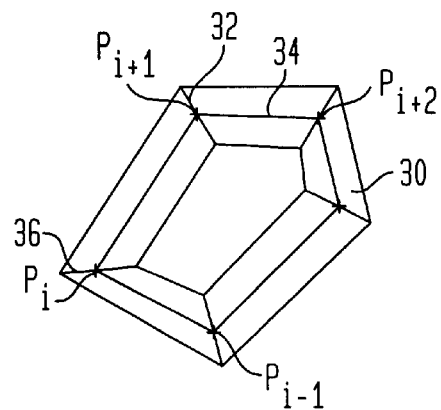
FIG. 13 is a prespective view of a defined search space.

Referring to FIG. 13, a search space 30 around the points 28 shown in FIG. 12A is created where guessed points 32 are linked by thick lines 34. An uncertainty line 36 around point $P_i$ is built by taking the perpendicular to $P_{i-1}$, $P_{i+1}$, moving it to be centered on $P_i$, and setting its length to 2W. The grouping of all the uncertainty lines defines an uncertainty band (search space 30) around the guessed contour. At every step, only neighbors that are inside the search space are explored by the algorithm. This ensures that the final optimal contour will be in the search space.

Figure 12B:
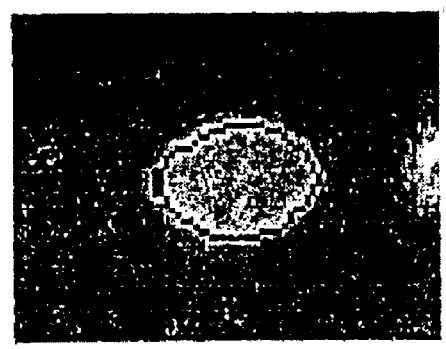
FIG. 12B is a photographic image of the cross-section of FIG. 12A having a recoved contour overlayed thereon.
Figure 14A:
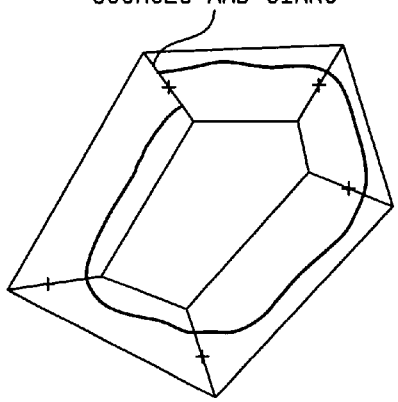
FIGS. 14A–C is a perspective view of the search space of FIG. 13 showing to passes aroung the search space to complete the contour of FIG. 12B.
Figure 14B:
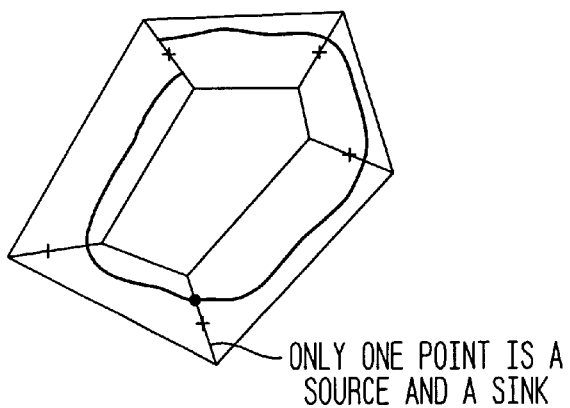
Figure 14C:
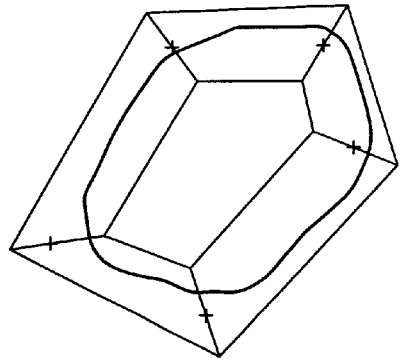

Closed contours are handled in the following manner. One point is chosen as a first point. All pixels on its uncertainty list are considered as sources and sinks and the minimum path algorithm is run. This produces a contour which might not start and end at the same point on the first (and last) uncertainty list. The algorithm is then repeated by choosing a pixel on the contour which intersects an uncertainty list opposite to the first one as the sole source and sink point, as shown in FIGS. 14A–C. The final contour is then continuous everywhere (see FIG. 14C). Referring to FIG. 12B, a recovered contour is shown for the points shown in FIG. 12A.

Figure 15A:
FIGS. 15A–C is a photographic image of a cross-section of a vertabra, an aorta and a trachea.
Figure 15B:
Figure 15C:

Referring now to FIGS. 15A–C, in some cases, particularly a vessel segmentation from CT images, the process of grouping pixels into a contour based on edge information alone may not produce the desired results. In FIG. 15A, an example of the system is shown in which an attempt to segment an aorta 44 is made. In this case, the edge following process is caught by other edges such as the edge on the black trachea 40 or the edge on the bright vertebra 42. The problem is not that the system was attracted to a local minimum of the energy function. The wrong segmentation is due to the fact that the unwanted edges are much stronger than the desired edges. To resolve this problem, an additional term has been introduced in the energy function to account for the homogeneity of the region of interest. Combining region and edge information to improve the active contours can be done. To combine these, first perform a region-based segmentation of the image using Markov random fields and maximum α posteriori estimation. Then, a term may be added to the energy function that forces the contour to enclose the region of interest. It has been proposed to use statistical information about the regions inside and outside the contour to define forces that guide the contour to the correct position. A number of pressure forces which combine intensity information The approach described in this disclosure combines precomputed region statistics and edge information in the active contour framework presented earlier. Dijkstra's algorithm cannot be used directly with region information because the contour is built one pixel at a time and statistics about the region inside the contour cannot be computed until the contour is built. To remedy this problem, an intermediate image called the homogeneity image is created. The purpose of this image is to enhance the desired edges and attenuate the others. The homogeneous gray level is modeled in the object of interest by a Gaussian distribution G(x) with parameters (m, σ²), which are given to the system. In a preferred embodiment, these statistics are calculated based on the region bounded by the 3D model estimate from Stage 1.

At a pixel (i, j)

let $(x_1,y_1)=(i+2 \cos(\vec{\nabla} I(i,j)), j+2 \sin(\vec{\nabla} I(i,j)))$ and $(x_2,y_2)=(i-2 \cos(\vec{\nabla} I(i,j)), j-2 \sin(\vec{\nabla} I(i,j)))$ be the pixels which are two pixels away along the gradient direction. We compute f(i,j) as the gray level for which I($x_1$, $y_1$)−m or I($x_1$, $y_1$)−m is minimum. Then, the homogeneity image at each pixel is defined as H(i,j)=G(f(i,j)). Basically, the gray level at each pixel is compared to the mean gray level. The gray level of a pixel on a boundary is not very meaningful, so it is better to compare a neighbor (two pixels away) which will be clearly inside the object. The homogeneous image for the object in FIG. 15A is shown in FIG. 15B. It may be seen that the object of interest is highlighted and most of the other objects are ignored. When edge detection is performed on this homogeneous image, the pixels along the boundary of the object of interest have highest gradient magnitude. Thus, the gradient magnitude of the homogeneous image is now used in the edge cost:

$$e(i, j, k, l) = \frac{l}{|\nabla H|^2 |\nabla I|^2 + \varepsilon}\left(\alpha\left[\frac{\phi_{ijkl}}{2\pi} + \sin(\phi_{ijkl})\right] + l\right)$$

where $$\phi_{ijkl}=|\vec{\nabla} I(i,j)-\vec{\nabla} I(k,l)|$$

encodes a curvature along the contour. Since the gray level of the regions around the object of interest are not known, the orientation of the gradient direction should be modulo π. A term $$\phi_{ijkl}/2\pi+\sin(\phi_{ijkl})$$

is used to allow the contour to abruptly change its orientation by π without changing its direction significantly.

FIG. 15C shows the new edge cost produces better results, and the system is able to segment the blood vessel. Using these techniques permits the generation of a series of 2D parallel contours sets which, taken together, finely delineate the 3D boundary of the object under study.

Stage 3: 3D Hybrid Model Fit

The intial approximation is fit to the object structure provided by the user in Stage 1 to the sampled segmented data garnered from Stage 2. The method employed is an iterative closest point method based on the physically-motivated recovery paradigm. In this paradigm, datapoints are thought of as exerting forces attracting the model towards them. The model is capable of rigid, parametric and local (spline-like) deformations. Local deformations may include a deformation penalty which serves to smooth the data. Finite element model (FEM) shape functions are used to distribute the data forces from element surfaces to element nodes. Both the data forces and smoothing forces are scaled, and the data forces are combined with the smoothing forces. The rigid and parametric fitting is discontinued once the local deformations are initiated.

Figure 16:
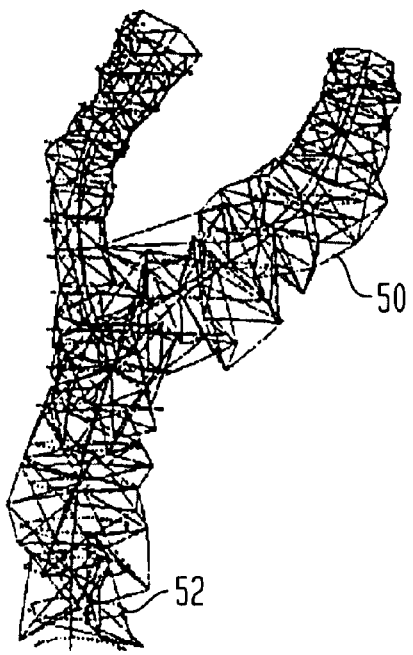
FIG. 16 is a computer rendering showing a shattered model and a parametric component intact.

Referring to FIG. 16, the above mentioned modifications were motivated by an attempt to maximize the speed of fitting without creating conditions of instability. These occur when, for example, the smoothing is so strictly enforced that small perturbations cause the model to shatter, or fly apart as shown in FIG. 16. When data and smoothing forces are not properly scaled with respect to one another, shattering may occur during the local fit. FIG. 16 shows a shattered model 50 and an intact model 52 within the shattered model 50. In addition, it is advantageous to make the fit as independent as possible from ad hoc scaling parameters.

In the physically-motivated scenario, each datapoint applies a force, $$\vec{f}$$

drawing a point (or region) on the model towards it. This force is a function of vector difference, $$\vec{d}$$

between the datapoint and the closest point on the model.

$$\vec{f}=F(\vec{d})$$

If the closest point lies on some element (as opposed to a node), a method is needed to distribute forces associated with that point to the nodes forming the element. This is because the element deforms as a function of its nodes. FEM shape functions may be used for this purpose. Thus, the force on node i is the product of the force $$\vec{f}$$

and the shape function, $N_i(s)$, evaluated at the point s in element coordinates.

$$\vec{f}_i = N_i(s) \vec{f}$$

Figure 17:
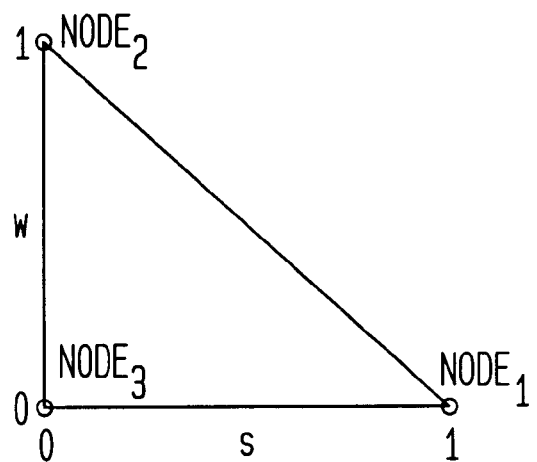
FIG. 17 is a represetation of a trianglular finite element.

Referring to FIG. 17, the FEM shape functions commonly employed for triangular elements are:

$$N_1(s,w)=s$$

$$N_2(s,w)=w$$

$$N_3(s,w)=(1-s-w),$$

They are appropriate for interpolating feature values over a body such as temperature or mass but are inefficient for distributing forces.

Figure 18:
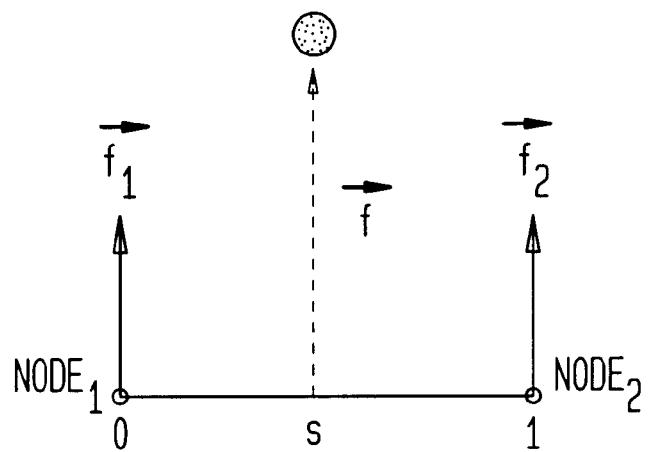
FIG. 18 is a vector diagram drawing representing prior art shape functions.

Referring to FIG. 18, the above described limitation becomes apparent in the following 1D analogy, $$N_1(s) \ (1-s)$$

$$N_2(s)=s,$$

with Node$_1$ at s=0 and Node$_2$ at s=1
For quantities such as temperature, a weighted average of the values at the nodes are a good estimation of a value between the nodes. Unfortunately, this is not appropriate for attractive data forces. A datapoint whose closest point is halfway between the nodes will have its force scaled in half and distributed to the nodes.

Eventually, in an iterative recovery scheme, the element will reach the data by moving halfway towards it in one iteration, then half that distance again, and again. To facilitate speedy recovery, these forces are usually scaled by some ad hoc constant or, the euler coefficient associated with recovery is set to a value that results in a satisfactorily fast fitting. A more general solution may be sought, however.

A set of shape functions are developed that will distribute the forces to the nodes such that the closest point on the element will move to the position of the data in a single iteration (in the absence of smoothing forces). One set of 1D shape functions that have been developed include, $$N_1(s)=1+(2s-1) \ (1-s) \ N_2(s) \ 1-(2s-1)s.$$

These shape functions will perform the move to the position of the data in a single iteration.

Figure 19A:
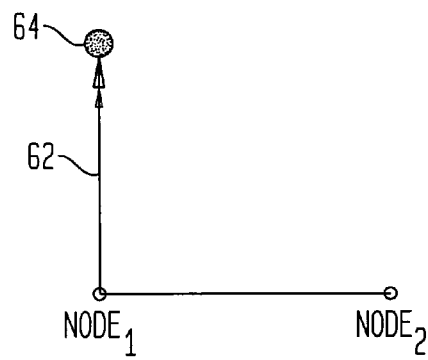
FIG. 19 is a vector diagram showing forces equally distributed among nodes.
Figure 19B:
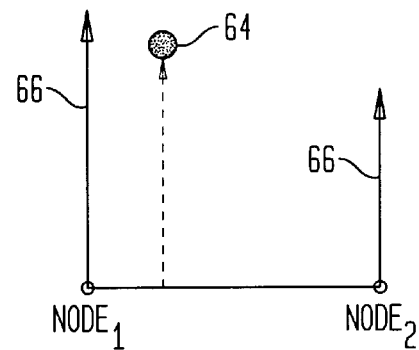
Figure 19C:
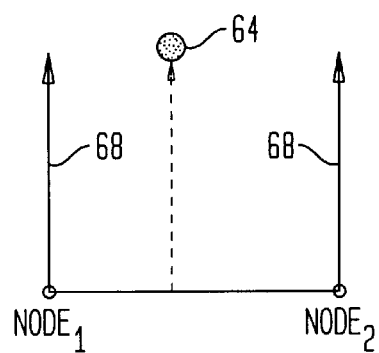

Referring to FIG. 19A–C, examples of bringing the elements to the data by forces in one step are illustrated. Forces 62 shown for a data point 64 are directly above Node$_1$ in FIG. 19A. Forces 66 on Node$_1$ exceed the distance to data point 64 to ensure a new element configuration would pass through datapoint 64, in FIG. 19B. Forces 68 are equally distributed to Node$_1$ and Node$_2$, in FIG. 19C.

Extending this formulation to higher dimensions is problematic, but achievable, due to the selection of the "center" of the higher dimension simplex element. An approximation to the above FEM shape functions is employed for higher dimensions:

$$N_1(s)=(1-s/\max(s, (1-s))$$

$$N_2(s)=s/\max(s, (1-s)).$$

This function set has the advantage that it is easily extendible to higher dimensional elements. For the triangular element, the shape functions takes the form, $$N_1(s,w)=s/\max(s,w, (1-s-w))$$

$$N_2(s,w)=w/\max(s,w, (1-s-w))$$

$$N_3(s,w)=(1-s-w)/\max(s,w, (1-s-w)).$$

It is these functions that are preferably applied to fit the model to the data.

If each node felt the force of only one datapoint there would be no need to scale the data forces. Unfortunately, this scenario is unlikely. Therefore, an intuitive approach to scaling has been developed for the forces on the model nodes.

Figure 20:
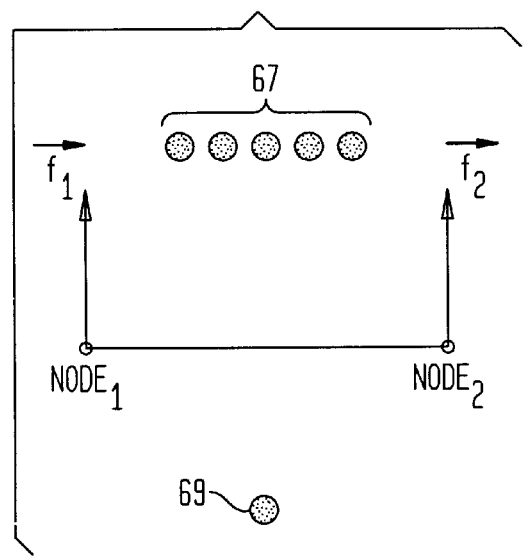
FIG. 20 is a vector diagram showing force scaling between datapoints.

Referring to FIG. 20, the goals of scaling are twofold: first, to ensure that the combined forces on a node will not push it past the weighted average of the datapoints attracting it, causing oscillations and second, to limit the influence of outliers in the fit. For example, five datapoints 67 at approximately the same position should have five times the attractiveness as a single datapoint 69 in a different position but at an equal distance, as illustrated in FIG. 20. The force scaling formulation discourages outliers.

The scaling factor is defined as:

$$K_{data} = \max_i \sum_{j=i}^{M} N_i(s(j)).$$

where i is the set of all nodes in the model and M is the number of datapoints associated with a node i thru some element. This will normalize by the maximal sum, $K_{data}$, over all the nodes, of the shape function values for datapoints associated with that node. Datapoint j has its closest point on the element s(j) in element coordinates and $N_i$ is the shape function for node i with respect to that element. Thus the scaled force on each node is:

$$\vec{f}data_i = \frac{1}{K_{data}} \sum_{j=1}^{M} N_i(s(j)) \vec{f}_j$$

where $$\vec{f}_j$$

is the force vector from datapoint j to the closest point on the element s(j).

Typically, the smoothing constraint is controlled by parameters which bias it towards, for example, either a membrane ($\omega_1$) or a thin-plate ($\omega_2$), $$\vec{f}smooth = \omega_1 \left\| \frac{\partial v(\xi)}{\partial \xi} \right\|^2 + \omega_2 \left\| \frac{\partial^2 v(\xi)}{\partial \xi^2} \right\|^2$$

where v represents a model surface parameterized by $\xi$.

Note that these continuous descriptions are implemented as stretching or curvature penalties. Our smoothing force on a node j, for example, is a function in the change in the element edge lengths, $$f_s = \frac{(initiallength - currentlength)}{2} \frac{(\vec{p}Node_i - \vec{p}Node_j)}{\|(\vec{p}Node_i - \vec{p}Node_j)\|}$$

for an edge made up of $Node_i$ and $Node_j$ with $$\vec{p}$$

signifying their positions. With the same goals in mind, these forces are scaled on the nodes in a manner similar to that of the data forces. For example, $$K_{smooth} = \max_i \sum^E \|\vec{f}_s\|$$

where E is the number of edges associated with node i. This gives, $$\vec{f}_{smooth_i} = \frac{\omega_1}{K_{smooth}} \sum^E \vec{f}_s$$

It is desirable to incorporate the smoothing constraint into the fitting process such that when there is no prior expectations of smoothness (i.e., a complete certainty in the data), the model will interpolate the data. Conversely, when the expectation for smoothness is at an extreme, the model will not deform from its "smooth" configuration prior to the local fit.

In the typical physically-motivated paradigm, total force on a node is calculated as:

$$f_{total} = f_{smooth} + f_{data}$$

In this framework, dramatically increasing the $\omega_1$ (or $\omega_2$) to strictly enforce smoothness may produce undesirable results. Particularly in smoothing functions with higher order polynomial terms, a slight change in nodal position due to data forces may result in a huge compensation force from the smoothness term, shattering the model (see FIG. 16).

Therefore, a method is used to enforce the goals outlined above. The stability is controlled by trading off the smoothness constraints with the data forces, $$\vec{f}_{total} = \tau \vec{f}_{smooth} + (1-\tau) f_{data}$$

Thus when $\tau=1$, the contribution of $f_{data}$ will be zero, the model will not deform and will maintain its initial "smooth" shape. When $\tau=1$, there is no smoothness constraint and the model interpolates the data. In all cases, the fit is quick and there is no danger of shattering.

It is not necessary to scale the forces by some ad hoc constant in order for one datapoint to draw a single element onto it. Therefore, it may be set to the function F relating the force of a single datapoint to the distance to the model in $$\vec{f} = F(\vec{d})$$

to be the identity function. The smoothing force is sufficient to return an edge to its original length. Therefore, the constant, $\omega_1$, associated with $$\vec{f}_{smooth_i} = \frac{\omega_1}{K_{smooth}} \sum^E \vec{f}_s$$

is set to unity. Finally, the total forces will not cause instability in the fit and will be sufficient to attract the model to the data quickly without any changes. Therefore we may set the euler coefficient's time steps to unity. Although $\tau$ seems to be an ad hoc parameter, it is intuitive enough to be left in the framework.

One goal of hybrid model recovery is a gross description of the object shape via the parametric model component. Typically, in hybrid model recovery rigid body characteristics (translation and rotation) are adjusted until they settle. Then, rigid body characteristics and the parametric component are fit. And, once they settle, the rigid body characteristics, the parametric component and the local component are fit. The present method breaks from this standard scheme by freezing the rigid body characteristics and parametric component during the local model fit. The rationale is that if the parametric component is to provide a gross description of the data it should arrive at the same result irrespective of the presence of a local component. In addition, freezing the rigid body characteristics and parametric component during the local model fit, speeds the fitting process significantly.

Experimental Results

We present three examples of applying our framework to recover vascular trees from computed tomographic image volumes.

Figure 21:
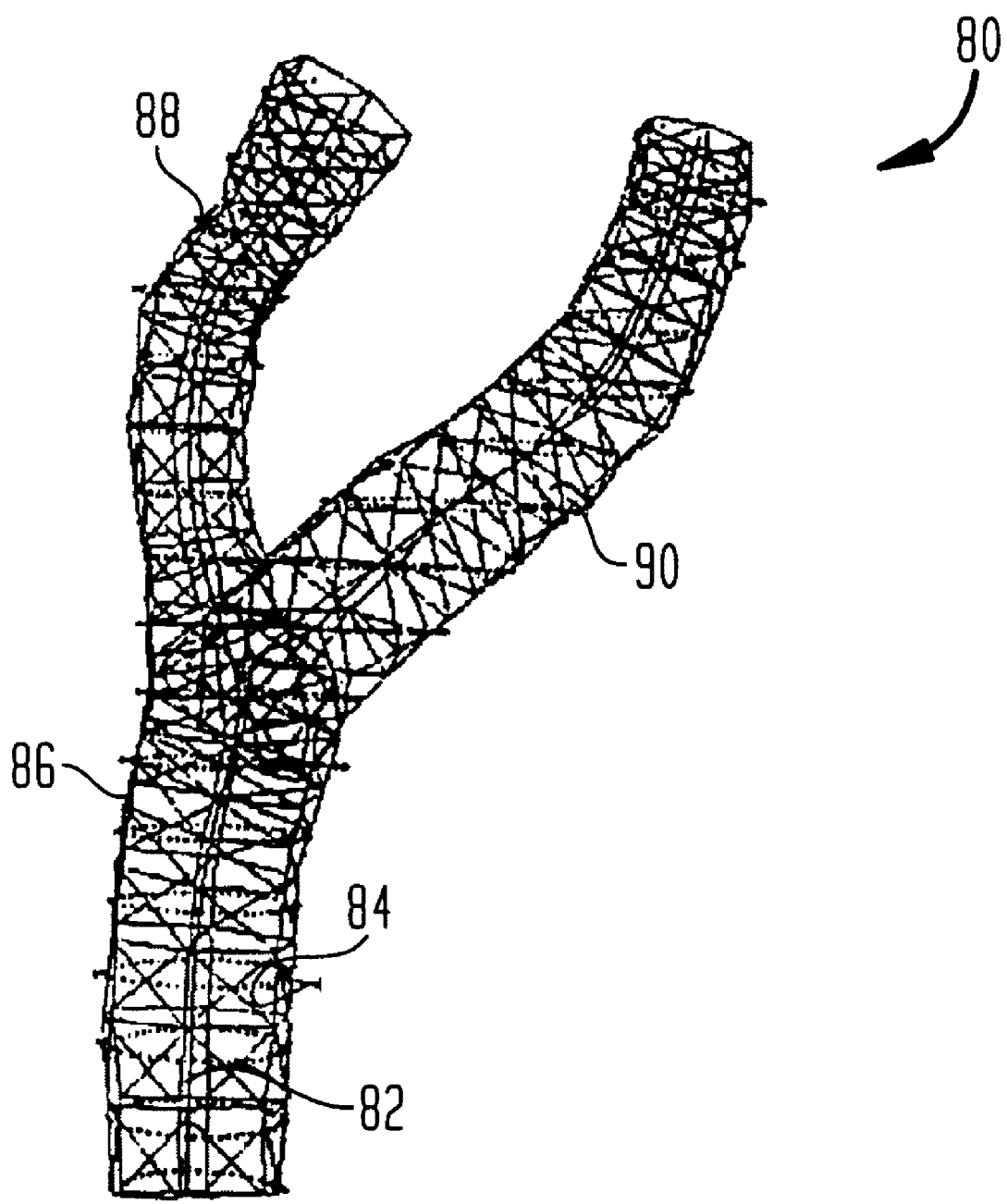
FIG. 21 is a computer rendering of a bifurcating carotid artery having a final fit performed by the method of the present invention.

Referring to FIG. 21, a final fit of a model of a bifurcating carotid artery 80 is illustrated. A spine 82 of the parametric component is shown. Datapoints 84 were the result of a segmentation in Stage 2 of the framework. Tl carotid 80 is made up of a base 86 and a left branch 88. A right branch 90 is the posterior auricular artery.

TABLE 1

| Knot Points | | | Radii | |
|---|---|---|---|---|
| x | y | z | P1 | P2 |
| External Carotid | | | | |
| 43.47 | 47.69 | 107.99 | 2.49 | 2.50 |
| 41.08 | 48.14 | 117.00 | 2.67 | 2.76 |
| 39.40 | 49.23 | 121.96 | 2.96 | 3.04 |
| 37.66 | 47.91 | 126.90 | 1.92 | 1.93 |
| 38.38 | 47.73 | 133.03 | 1.81 | 1.83 |
| 39.51 | 49.40 | 136.01 | 1.64 | 1.61 |
| 38.80 | 51.80 | 140.00 | 2.34 | 2.33 |
| Posterior Auricular | | | | |
| 39.11 | 48.88 | 121.06 | 3.01 | 2.84 |
| 37.68 | 54.72 | 126.95 | 3.25 | 3.09 |
| 36.73 | 60.19 | 131.00 | 2.95 | 2.92 |
| 37.68 | 62.77 | 135.93 | 2.25 | 2.30 |
| 38.11 | 63.83 | 140.01 | 1.80 | 1.83 |

The smoothing parameter $\tau$ was set to 0.7 and the equilibrium thresholds for the rigid body, parametric component, and local component fits were 0.01 0.05 and 0.005 respectively. Fitting required 60 iterations of the algorithm of the present invention and took approximately 3 minutes on an SGI Indigo workstation. Table 1 contains the values associated with the parameters component of the model. The final fit of our model to a more tortuous bifurcating carotid artery and its intersection with the original image set.

Figure 22:
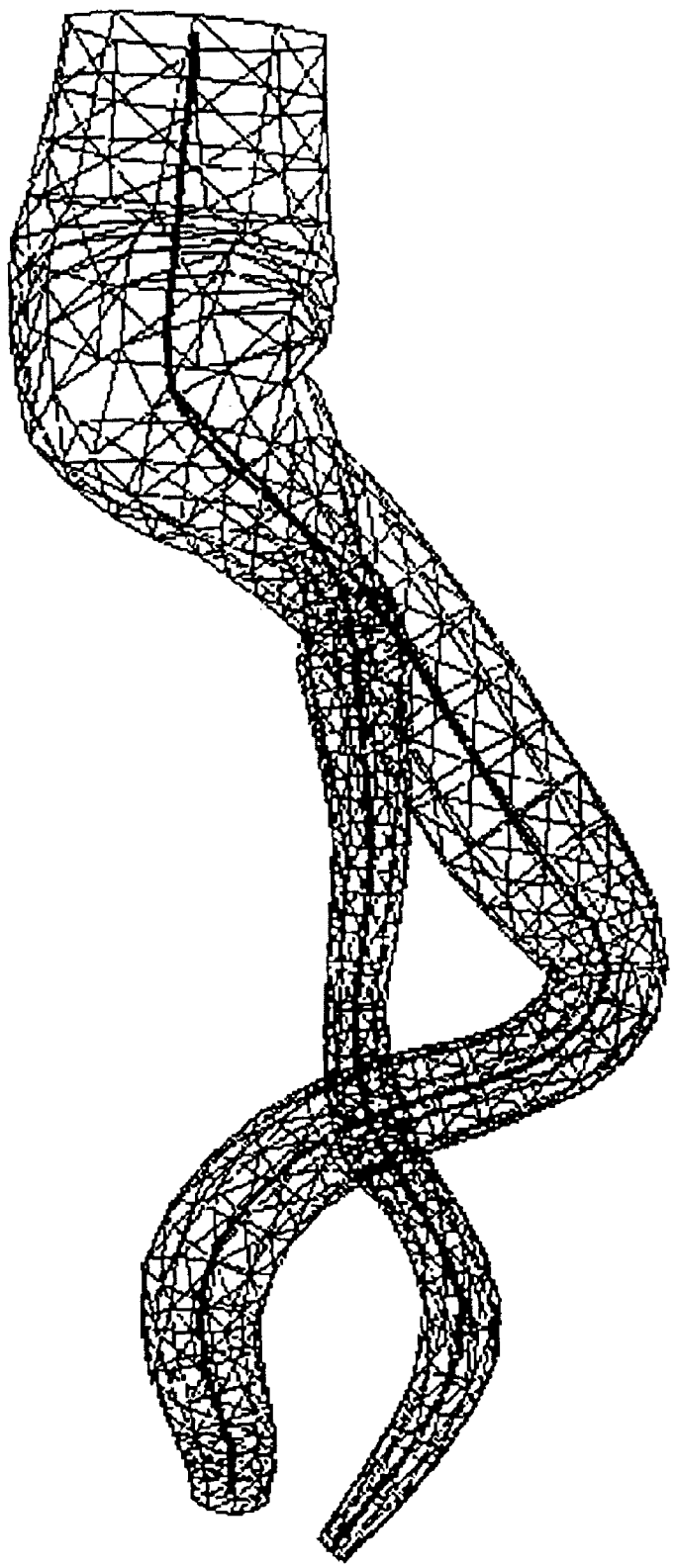
FIG. 22 is a computer rendering of a diseased bifurcating carotid artery having a final fit performed by the method of the present invention.

Referring to FIG. 22, the results of a more challenging recovery associated with a diseased carotid artery is shown.

Figure 23:
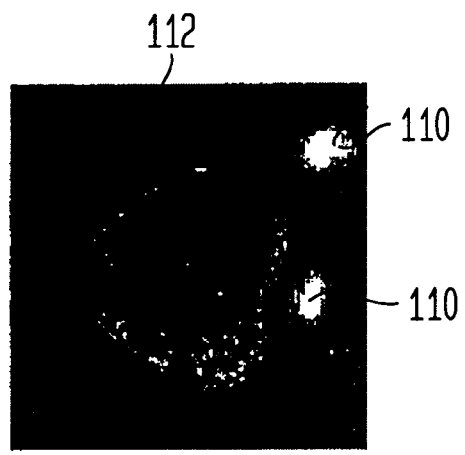
FIG. 23 is a photographic image of a cross-section of a lumen having calcifications adjacent thereto.

While the fitting parameters were the same as for the healthy carotid shown in FIG. 21, the fit took many more iterations (110) due to its complexity. The segmentation in Stage 2 of the algorithm was successful in delineating the vessel's structure even in the presence of calcifications 110 (see FIG. 23). The optimal active contour is able to locate a vessel lumen 112 even in the presence of calcification 110 (the two white regions). The values associated with the parametric component are shown in Table 2.

TABLE 2

| Knot Points | | | Radii | |
|---|---|---|---|---|
| x | y | z | P1 | P2 |
| External Carotid | | | | |
| 41.06 | 63.43 | 109.97 | 3.67 | 3.65 |
| 41.05 | 64.07 | 116.01 | 4.54 | 4.62 |
| 42.06 | 63.40 | 120.04 | 4.27 | 4.31 |
| 40.29 | 62.27 | 122.83 | 2.48 | 2.51 |
| 36.03 | 61.68 | 126.06 | 2.07 | 2.04 |
| 32.73 | 59.33 | 132.14 | 2.22 | 2.22 |
| 30.18 | 58.59 | 136.00 | 1.69 | 1.70 |
| 32.23 | 60.06 | 138.99 | 1.18 | 1.20 |
| 37.43 | 61.67 | 140.98 | 1.66 | 1.66 |
| 41.60 | 62.19 | 145.00 | 1.69 | 1.69 |
| 41.5 | 861.8 | 149.0 | 71.1 | 11.18 |
| 41.0 | 062.4 | 150.9 | 61.0 | 91.08 |
| Posterior Auricular | | | | |
| 41.96 | 65.05 | 120.91 | 3.72 | 3.83 |
| 35.68 | 65.74 | 124.96 | 1.35 | 1.38 |
| 34.50 | 65.67 | 126.97 | 1.34 | 1.34 |
| 34.83 | 64.18 | 131.98 | 1.17 | 1.19 |
| 35.86 | 63.68 | 137.00 | 1.14 | 1.15 |
| 34.31 | 66.00 | 140.02 | 1.22 | 1.22 |
| 31.91 | 68.07 | 141.98 | 0.92 | 0.87 |
| 26.54 | 74.32 | 145.98 | 1.50 | 1.45 |
| 28.11 | 79.27 | 151.01 | 0.78 | 0.75 |

Figure 24:
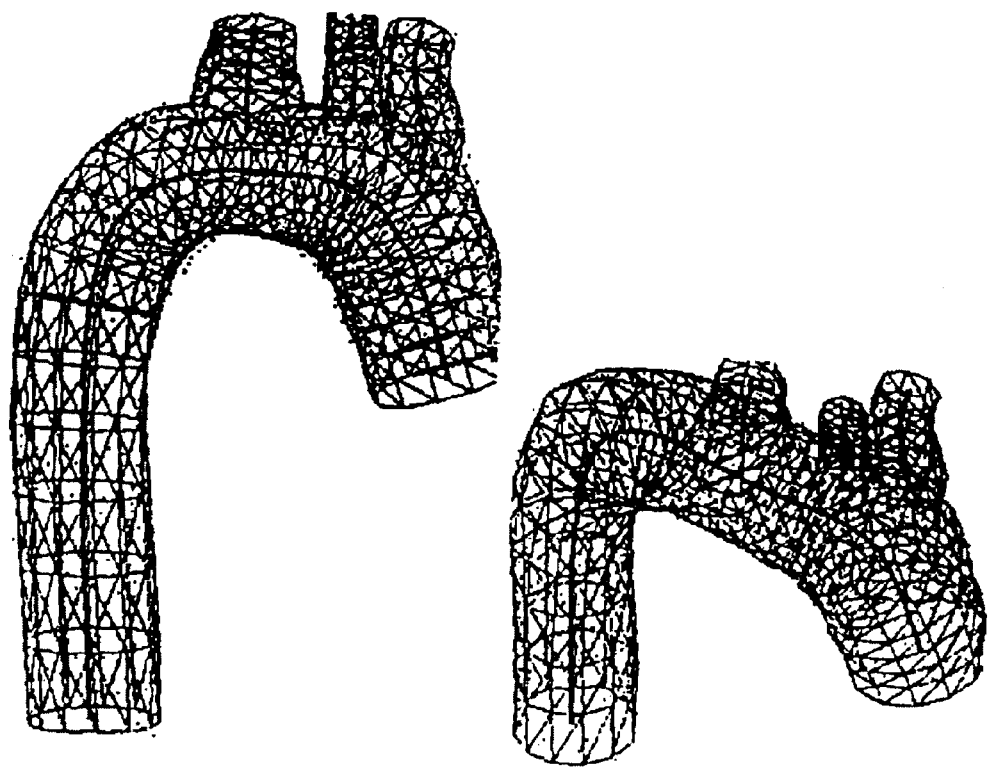
FIG. 24 is a computer rendering of a branching aortic arch having a final fit performed by the method of the present invention.

Referring to FIG. 24, the recovery of a healthy branching aortic arch using the same fitting parameters of FIGS. 21 and 22 is shown.

A cooperative framework using 2D active contour models and 3D hybrid models for segmentation has been described and demonstrated on branching cylindrical structures. The model employed has a novel parametric component which is a fusion of individual cylinders which have spines that are arbitrary space curves and cross-sections which may be any star shaped planar curve. In addition, several new variations were introduced on the physically-motivated paradigm which seeks to speed recovery while ensuring stability.

Having described preferred embodiments of a framework for segmentation of cylindrical structures using two dimensional active contours and three dimensional hybrid models (which are intended to be illustrative and not limiting), it is noted that the modifications and variations could be made by those skilled in the art in light of the above teachings. For example, a rotation parameter in the cross-section component of the parametric cylinder component may be introduced and attempts to lessen the reliance on user initialization of the model by automation may be included. It is therefore to be understood that changes may be made in the particular embodiments of the invention disclosed which are within the scope and spirit of the invention delined by the appended claims.

What is claimed is:

1. A method of modeling a structure comprising the steps of:
   initializing a parametric component of a hybrid model from a vohumetric image, the volumetric image comprising image planes;
   creating starting points for two dimensional segmentations at intersections between the parametric component and the image planes;
   segmenting a boundary of the structure by applying active contours;
   sampling the active contours to create a dataset;
   parametrically and locally fitting the hybrid model to the dataset to represent the structure;
   reducing a number of iterations to fit the hybrid model by introducing a finite element shape function for distributing forces to draw the hybrid model to data of the dataset wherein the forces include data forces and smoothing forces;
   introducing a scale factor to weight data locations from the dataset to provide a scaled force vector for more rapidly fitting the hybrid model to the dataset; and
   combining the data forces and the smoothing forces by introducing a trade-off parameter $\vartheta$ for balancing data forces against smoothing forces and thereby providing increased stability to the fitting of the hybrid model.

2. The method of modeling a structure as recited in claim 1 wherein the shape function is represented by a formula:

$$N_1(s) = 1 + (2s-1)(1-s)$$

$$N_2(s) = 1 - (2s-1)s$$

where $N_1(s)$ is the shape function evaluated at a first node at point s and $N_2(s)$ is the shape function evaluated at a second node at point s.

3. The method of modeling a structure as recited in claim 1 wherein the shape function is represented by a formula:

$$N_1(s) = (1-s)/\max(s, (1-s))$$

$$N_2(s) = s/\max(s, (1-s))$$

where $N_1(s)$ is the shape function evaluated at a first node at point s and $N_2(s)$ is the shape function evaluated at a second node at point s.

4. The method of modeling a structure as recited in claim 1 wherein the scale factor is represented by a formula:

$$K_{data} = \max_i \sum_{j=i}^{M} N_i(s(j))$$

where i is a set of all nodes and M is a number of datapoints associated with a node i,j which has a closest point to an element s(j) in element coordinates and $N_i$ is a shape function for node i with respect to element s(j).

5. The method of modeling a structure as recited in claim 1 wherein the dataset represents three dimensions.

6. A method of modeling branching cylindrical structures comprising the steps of:
   initializing a parametric component of a three dimensional hybrid model from a volumetric image of the branching structure; the volumetric image comprising image planes;
   creating starting points for two dimensional segmentations at intersections between the branching structure and the image planes;
   segmenting the branching structure by applying two dimensional active contours to the image planes to more accurately depict features of the branching structure;

sampling the active contours to create a dataset;
parametrically and locally fitting the hybrid model to the dataset to represent the branching structure by applying forces to draw the hybrid model onto the data of the dataset;
reducing a number of iterations to fit the hybrid model by introducing a finite element shape function for distributing forces to draw the hybrid to data of the dataset;
introducing a scale factor to weight data locations from the dataset to provide a scaled force vector for more rapidly fitting the hybrid model to the dataset, wherein the scale factor is represented by the formula:

$$K_{data} = \max_{i} \sum_{j=i}^{M} N_i(s(j))$$

where i is a set of all nodes and M is a number of datapoints associated with a node i,j which has a closest point to an element s(j) in element coordinates and $N_i$ is a shape function for node i with respect to element s(j).

7. The method of modeling branching cylindrical structures as recited in claim 6 wherein the dataset represents three dimensions.

8. The method of modeling branching cylindrical structures as recited in claim 11 wherein the shape function is represented by the formula:

$N_1(s)=1+(2s-1)(1-s)$ $N_2(s)=1-(2s-1)s$ where $N_1(s)$ is the shape function evaluated at a first node at point s and $N_2(s)$ is the shape function evaluated at a second node at point s.

9. The method of modeling branching cylindrical structures as recited in claim 11 wherein the shape function is represented by the formula:

$N_1(s)=(1-s/\max(s, (1-s))$ $N_2(s)=s/\max(s, (1-s))$ where $N_1(s)$ is the shape function evaluated at a first node at point s and $N_2(s)$ is the shape function evaluated at a second node at point s.

10. The method of modeling branching cylindrical structures as recited in claim 6 wherein the forces include data forces and smoothing forces.

11. The method of modeling a structure as recited in claim 10 further comprising the step of combining the data forces and the smoothing forces by introducing a trade-off parameter τ for balancing data forces against smoothing forces and thereby providing increased stability to the fitting of the hybrid model.

12. A method of modeling a structure, comprising the steps of:
initializing a parametric component of a hybrid model from a volumetric image, the volumetric image comprising image planes;
creating starting points for two dimensional segmentations at intersections between the parametric component and the image planes;
segmenting a boundary of the structure by applying active contours;
sampling the active contours to create a dataset;
parametrically and locally fitting the hybrid model to the dataset to represent the structure;
reducing a number of iterations to fit the hybrid model by introducing a finite element shape function for distributing forces to draw the hybrid model to data of the dataset, wherein the shape function is represented by a formula:

$N_1(s)=1+(2s-1)(1-s)$ $N_2(s)=1-(2s-1)s$ where $N_1(s)$ is the shape function evaluated at a first node at point s and $N_2(s)$ is the shape function evaluated at a second node at point s.

13. The method of modeling a structure as recited in claim 12 wherein the step of parametrically and locally fitting the hybrid model includes the step of applying forces to draw the hybrid model onto the data of the dataset.

14. The method of modeling a structure as recited in claim 13 wherein the forces include data forces and smoothing forces.

15. The method of modeling a structure as recited in claim 14, further comprising the step of combining the data forces and the smoothing forces by introducing a trade-off parameter $\vartheta$ for balancing data forces against smoothing forces and thereby providing increased stability to the fitting of the hybrid model.

16. The method of modeling a structure as recited in claim 12, further comprising the step of introducing a scale factor to weight data locations from the dataset to provide a scaled force vector for more rapidly fitting the hybrid model to the dataset.

17. The method of modeling a structure as recited in claim 16 wherein the scale factor is represented by a formula:

$$K_{data} = \max_{i} \sum_{j=i}^{M} N_i(s(j))$$

where i is a set of all nodes and M is a number of datapoints associated with a node i,j which has a closest point to an element s(j) in element coordinates and $N_i$ is a shape function for node i with respect to element s(j).

18. The method of modeling a structure as recited in claim 12 wherein the dataset represents three dimensions.

19. A method of modeling a structure comprising the steps of:
initializing a parametric component of a hybrid model from a volumetric image, the volumetric image comprising image planes;
creating starting points for two dimensional segmentations at intersections between the parametric component and the image planes;
segmenting a boundary of the structure by applying active contours;
sampling the active contours to create a dataset;
parametrically and locally fitting the hybrid model to the dataset to represent the structure;
reducing a number of iterations to fit the hybrid model by introducing a finite element shape function for distributing forces to draw the hybrid model to data of the dataset, wherein the shape function is represented by a formula:

$N_1(s)=(1-s/\max(s, (1-s))$ $$N_2(s) = s/\max(s, (1-s))$$

where $N_1(s)$ is the shape function evaluated at a first node at point s and $N_2(s)$ is the shape function evaluated at a second node at point s.

20. The method of modeling a structure as recited in claim 19 wherein the step of parametrically and locally fitting the hybrid model includes the step of applying forces to draw the hybrid model onto the data of the dataset.

21. The method of modeling a structure as recited in claim 20 wherein the forces include data forces and smoothing forces.

22. The method of modeling a structure as recited in claim 21, further comprising the step of combining the data forces and the smoothing forces by introducing a trade-off parameter ϑ for balancing data forces against smoothing forces and thereby providing increased stability to the fitting of the hybrid model.

23. The method of modeling a structure as recited in claim 19, further comprising the step of introducing a scale factor to weight data locations from the dataset to provide a scaled force vector for more rapidly fitting the hybrid model to the dataset.

24. The method of modeling a structure as recited in claim 23 wherein the scale factor is represented by a formula:

$$K_{data} = \max_{i} \sum_{j=i}^{M} N_i(s(j))$$

where i is a set of all nodes and M is a number of datapoints associated with a node i,j which has a closest point to an element s(j) in element coordinates and $N_i$ is a shape function for node i with respect to element s(j).

25. The method of modeling a structure as recited in claim 19 wherein the dataset represents three dimensions.

* * * * *